US007204415B2

(12) United States Patent
Payne et al.

(10) Patent No.: US 7,204,415 B2
(45) Date of Patent: Apr. 17, 2007

(54) METHODS AND SYSTEMS FOR PROVIDING SECONDARY ADDRESS INFORMATION

(75) Inventors: David J. Payne, Collierville, TN (US); Robert F. Snapp, Memphis, TN (US); James D. Wilson, Collierville, TN (US)

(73) Assignee: United States Postal Service, Washington, DC (US)

( * ) Notice: Subject to any disclaimer, the term of this patent is extended or adjusted under 35 U.S.C. 154(b) by 24 days.

(21) Appl. No.: 10/953,358

(22) Filed: Sep. 30, 2004

(65) Prior Publication Data

US 2005/0197966 A1 Sep. 8, 2005

Related U.S. Application Data

(60) Provisional application No. 60/532,713, filed on Dec. 29, 2003.

(51) Int. Cl.
*G06F 19/00* (2006.01)

(52) U.S. Cl. ................ 235/385; 235/487; 235/462.01; 235/494; 209/584

(58) Field of Classification Search ................ 235/380, 235/494; 209/584; 705/62
See application file for complete search history.

(56) References Cited

U.S. PATENT DOCUMENTS 5,249,687 A * 10/1993 Rosenbaum et al. ......... 209/3.3
5,420,403 A 5/1995 Allum et al.
5,431,288 A * 7/1995 Nishijima et al. .......... 209/584
6,006,200 A 12/1999 Boies et al.
6,886,747 B2 * 5/2005 Snapp ........................ 235/385

FOREIGN PATENT DOCUMENTS

WO WO 02/077874 A1 10/2002

OTHER PUBLICATIONS

International Search Report in PCT Application No. PCT/US04/32590, mailed Feb. 18, 2005.
Written Opinion in PCT Application No. PCT/US04/32590, mailed Feb. 18, 2005.

* cited by examiner

*Primary Examiner*—Seung Ho Lee
(74) *Attorney, Agent, or Firm*—Finnegan, Henderson, Farabow, Garrett & Dunner, LLP

(57) ABSTRACT

Systems and methods maintain a database of recipient names and addresses where the delivery point addresses contain secondary address. Data that is stored in the database may be arrayed in secure data tables. The structure of the secure data tables ensures that the data is secure and prevents an unauthorized user from learning address information improperly. A delivery service provider may create secure data tables using 20-byte Secure Hash Algorithm. A software searches secure data tables for the matching recipient name and address. If the match is found, a business sender may receive valid secondary address information for that recipient. If, however, a database does not contain a matching recipient name and address, a business sender may not receive any further information about that recipient's address.

19 Claims, 5 Drawing Sheets

100

| 102 | 104 | | 106 | | | 108 | |
|---|---|---|---|---|---|---|---|
| Zip Code | Primary Address Information | | Secondary Address Information | | | Zip +4 Code | |
| | Building Number | Street Name | Description | Lowest Secondary Number | Highest Secondary Number | | |
| 38108 | 775 | York Ave. | — | — | — | 38108 - 1120 | 110 |
| 38108 | 775 | York Ave. | Apt. | 101 | 120 | 38108 - 1121 | 112 |
| 38108 | 775 | York Ave. | Apt. | 201 | 220 | 38108 - 1122 | 114 |
| 38108 | 775 | York Ave. | Apt. | 301 | 320 | 38108 - 1123 | 116 |

100

| Zip Code (102) | Primary Address Information (104) | | Secondary Address Information (106) | | | Zip +4 Code (108) | |
|---|---|---|---|---|---|---|---|
| | Building Number | Street Name | Description | Lowest Secondary Number | Highest Secondary Number | | |
| 38108 | 775 | York Ave. | — | — | — | 38108 - 1120 | 110 |
| 38108 | 775 | York Ave. | Apt. | 101 | 120 | 38108 - 1121 | 112 |
| 38108 | 775 | York Ave. | Apt. | 201 | 220 | 38108 - 1122 | 114 |
| 38108 | 775 | York Ave. | Apt. | 301 | 320 | 38108 - 1123 | 116 |

FIG. 1

METHODS AND SYSTEMS FOR PROVIDING SECONDARY ADDRESS INFORMATION

This application claims priority to U.S. Provisional Application No. 60/532,713, filed on Dec. 29, 2003, the contents of which are hereby incorporated by reference into this application as if set forth herein in full.

TECHNICAL FIELD

This invention relates generally to providing secondary address information to business senders in a secure manner. In particular, methods and systems consistent with the present invention provide business senders with the ability to determine secondary address information while maintaining data in a secure fashion such that business senders may only access secondary address information for addresses that are already in a business sender's possession.

BACKGROUND

Today's consumer receives, via delivery senders, numerous advertisements, promotions, and other correspondence from business entities. Every day various business senders dispatch significant number of delivery items to their customers. A business sender sending numerous delivery items may desire a delivery fee discount from a delivery service provider. A delivery service provider, such as the United States Postal Service (USPS), may offer a postage discount to a business sender in exchange for the business sender affixing an 11-digit barcode to each delivery item sent by that business sender. The 11-digit barcode may uniquely identify an address for a delivery point. Further, the 11-digit barcode may allow the delivery service provider to automatically sort the mail in delivery sequence order.

A recipient address information may consist of a recipient name, a street address, and a ZIP™ code. In many locations, such as an apartment building, a condominium, a trailer park, an office building, or an outlet in a shopping mall, multiple recipients share the same street address and the same ZIP™ code. Use of a mail recipient name in combination with secondary address information, such as an apartment number, a suite number, or a lot number, may enable creation of a unique address for each delivery point.

A significant percentage of items destined for delivery require a secondary address information to uniquely identify a delivery point. When the secondary address information of the delivery item is missing or incorrect, the delivery service provider cannot use the corresponding 11-digit barcode for automated sorting of that delivery item in the delivery sequence order. Such items will require additional handling by the delivery employee prior to delivery, thereby increasing the time required to serve customers on the postal carrier's route. It is therefore desirable to provide methods and systems for development and maintenance of a database containing secondary address information by relating recipients' names to their correct, complete addresses and providing that information to business senders in a secure manner without violating privacy laws.

SUMMARY

Systems and methods consistent with the present invention maintain a database of recipients names and addresses where the delivery point addresses contain secondary address information. A database may store secondary address information available from private and postal sources, and may be updated by using Change of Address data received from recipients that have had a change of delivery address.

Data that is stored in the database may be arrayed in secure data tables. The structure of the secure data tables ensures that the data is secure and prevents an unauthorized user from learning address information improperly. A delivery service provider may create secure data tables using a hash code, such as a 20-byte Secure Hash Algorithm (SHA) code. Each code represents the recipient's name and an address, including a secondary address.

To gain access to the data stored in the secure data tables, a business sender must provide the name and address of a particular recipient, including a default delivery code. A software searches secure data tables for a matching recipient name and address. If a match is found, a business sender may receive valid secondary address information for that recipient. If, however, a database does not contain a matching recipient name and address, a business sender may not receive any further information about that recipient's address.

Due to the secure nature of the data, the business sender is unable to obtain a list of residents or tenants, or the number of suites located at a particular address. As a result, business senders may be able to determine the complete address for many customers for whom they now have only a partial address, thereby improving the deliverability of the addresses by the delivery service provider.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 1 is an exemplary database structure illustrating how the ZIP+4™ code is assigned to a point of delivery for a delivery item, consistent with the invention.

DESCRIPTION OF THE EMBODIMENTS

Figure 2:
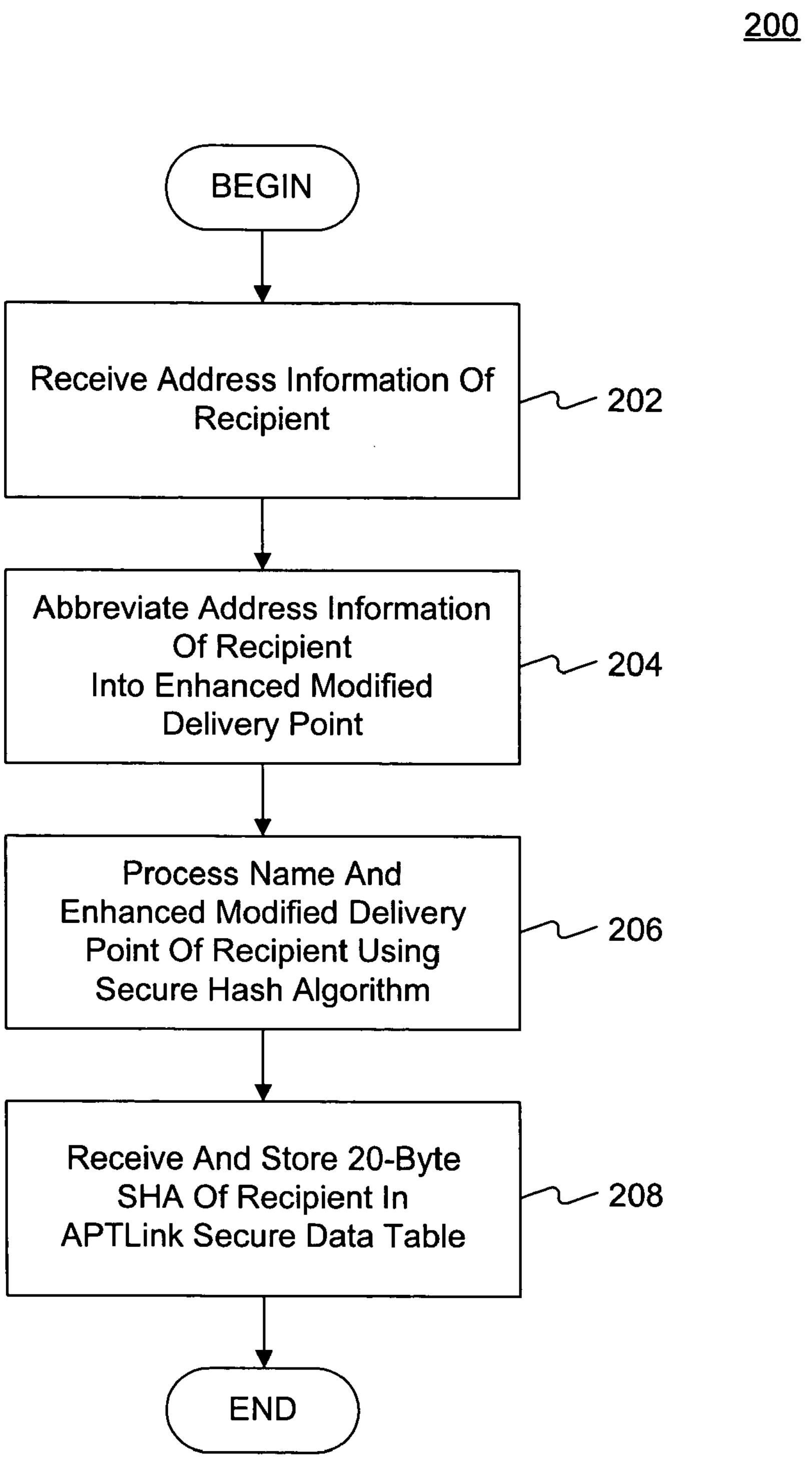
FIG. 2 is a flowchart of an exemplary process for converting address information of recipients for storage in the APTLink database, consistent with the invention.

Reference will now be made in detail to the present exemplary embodiments of the invention, examples of which are illustrated in the accompanying drawings. Wherever possible, the same reference numbers will be used throughout the drawings to refer to the same or like parts.

Delivery codes are as well known in the art. For example, the first five digits of a 9-digit ZIP™ code in the ZIP+4™ format represent a specific geographical region within the United States. More specifically, the first digit designates a broad geographical area of the United States, ranging from zero for the Northeast to nine for the far West. The second and third digits more closely pinpoint population concentrations and those sectional centers accessible to common transportation networks. The fourth and fifth digits designate small post offices or postal zones in larger zoned cities.

The last four digits in the ZIP+4™ code will now be described. The sixth and seventh numbers denote a delivery sector, which may include, for example, several blocks, a group of streets, a group of post office boxes, several office buildings, a single high-rise office building, a large apartment building, or a small geographic area. The last two numbers denote a delivery segment, which may include, for example, one floor of an office building, one side of a street between intersecting streets, specific departments in a firm, or a group of post office boxes, etc.

When four or more dwellings, apartments, or offices have a common primary address information, such as street address, but different secondary address information, the building may be assigned two or more distinct ZIP+4™ codes. When mail is delivered into multiple clusters of receptacles, a unique ZIP+4™ code may be assigned to each cluster. When mail is delivered to multiple floors within a high-rise building, each floor may be assigned a unique ZIP+4™ code. To receive a unique ZIP+4™ code for a cluster of receptacles or for a specific floor, the address must contain the secondary address information designating, for example, an apartment, suite, or lot number.

Delivery service providers may use automated processing equipment for processing delivery items and sorting delivery items for subsequent delivery. To facilitate the use of the processing equipment, a delivery service provider, such as the USPS, may maintain a database, such as a ZIP+4™ database, for storing conventional address information of recipients, including a recipient name, street information, and a geographical code, such as a ZIP™ code, along with a corresponding ZIP+4™ code, that is, 9-digit format. The database may be any appropriate type of database, and may use, for example, proprietary or commercially available software such as an Oracle database. An example will now be described with respect to the United States Postal Service regarding delivery of delivery items. However, it is to be understood that the invention is not so limited and may be employed by other delivery service providers handling other delivery items.

FIG. 1 is a table 100 reflecting an exemplary database structure illustrating how the ZIP+4™ code is assigned to a point of delivery for delivery items, such as a mailpiece. Each recipient with identical primary address information 104, such as building number and the street address, may be assigned the same first five digits of the ZIP+4™ code 108 identical to the ZIP™ code 102. For example, for each addressee whose primary address information is 775 York Avenue in Memphis, Tenn., the number 38108 is assigned as the first five digits of the ZIP+4™ code because the ZIP™ code at this address is 38108 (row 110). In addition, for each addressee, depending on the recipient's secondary mailing information 106, such as an apartment number, the last four digits of the ZIP+4™ code may also be assigned. For example, each tenant with the apartment number from 101 to 120, is assigned ZIP+4™ code of 38108-1121 (row 112). Each tenant with an apartment number from 201 to 220, is assigned ZIP+4™ code of 38108-1122 (row 114) and each tenant with an apartment number from 301 to 320, is assigned ZIP+4™ code of 38108-1123 (row 116).

The database may also have a record for the building as a whole. This record is known in the art as a "Building Default." The Building Default is used to capture addresses with missing or erroneous secondary address information. Indeed, a Building Default number may be assigned as last four digits of the ZIP+4™ code for each addressee whose secondary address information is erroneous or not available. For example, an intended recipient of mail whose address information is 775 York Avenue, Memphis, Tenn. with an apartment number not identified on a delivery item, is assigned ZIP+4™ code of 38108-1120, the default ZIP+4™ code for that building (FIG. 1, row 110). In addition, recipients at 775 York Avenue in Memphis, Tenn., whose apartment numbers appear on mailpieces, but are not between the listed apartment number 101 and 120, 201 and 220, or 301 and 320, are also assigned the default ZIP+4™ code of 38108-1120 (row 110). For example, a recipient whose address is identified on a mailpiece as 775 York Avenue, Apartment 500, Memphis, Tenn. is assigned the default ZIP+4™ code of 38108-1120 because apartment number 500 does not exist in the database at that address.

In addition to using ZIP+4™ code, business senders and delivery service providers may also use an extended delivery code, such as a ZIP+4+2™ code, an 11-digit format. The unique 11-digit barcode for each recipient may allow automated sorting equipment to sort the mail through the mail processing systems into the correct sequence of delivery. The first nine digits of the 11-digit format may be identical to the nine digits of the ZIP+4™ code. The last two digits of the 11-digit format are known in the art as an Delivery Point Code. When the Delivery Point Code is appended to the ZIP+4™ code, it may uniquely identify a complete address of a recipient. For example, the complete address of 775 York Avenue, Apartment 303, Memphis, Tenn. 38108, may be assigned the Delivery Point Code of 78. This two-digit code may be unique, to apartment 303 located at that mailing address. A mailpiece addressed to that address information will then be assigned a barcode of 38108-1123-78 representing the complete ZIP+4+2™ code.

A Delivery Point Code cannot be assigned if a recipient's address does not include secondary address information, and a delivery point cannot be uniquely identified. Indeed, an address having erroneous secondary address information may also prevent an assignment of a unique Delivery Point Code. A delivery service provider may then assign a common, or default, Delivery Point Code, for example, number 99, to all mail with missing or erroneous secondary address information. For example, all mail assigned the Building Default ZIP+4™ code will receive a common Delivery Point Code of 99 and will be sorted together. This may result in additional handling of mail by a delivery service provider before it can be delivered. It may also increase the chances that mail will not be delivered if a carrier cannot associate a name of the intended recipient with a specific delivery point.

A delivery service provider, such as the USPS, may offer a delivery fee discount to a business sender, if an 11-digit barcode is affixed to each delivery item mailed by that business sender. For example, a business sender sending a significant volume of mail on a regular basis may wish to receive a postage discount. To receive a discount, a business sender may have to generate and affix the ZIP+4+2™ (11-digit format) barcode to all mailpieces it intends to mail.

A business sender may not always have correct secondary address information for all of its mail recipients. For example, a business sender's mailing list may lack apartment numbers for some of tenants of a high-rise apartment building. Absence of correct secondary address information may prevent a business sender from having an 11-digit barcode sufficient for automated processing and sorting all of its mail by a delivery service provider in delivery sequence order. This may result in a delay of the mail delivery or even a return of mail to a business sender due to the delivery service provider inability to deliver mail. To decrease the volume of mail that has missing or incorrect secondary address information, a delivery service provider, such as the USPS, may develop and maintain a secondary delivery address information database, such as an Apartment Link (APTLink) database. The APTLink database may store recipients' names with complete addresses.

FIG. 2 is a flowchart of an exemplary process 200 for converting address information of recipients for storage in the APTLink database. It may include receiving a name and a address information of a recipient. (Stage 202). Based on address information alone, a delivery service provider then may create an Enhanced Modified Delivery Point (EMDP). (Stage 204). The EMDP is a sequence of seventeen numerals representing a recipient's ZIP+4™ code, street address, and Delivery Point Code. A detailed description of the EMDP is provided in the U.S. patent application Ser. No. 10,297,986, filed Dec. 12, 2002, the contents of which are hereby incorporated by reference.

Then for each recipient, the name and EDMP are combined for creating a secure unique identifier for that recipient. A unique identifier may be created by using a processing algorithm, such as a Secure Hash Algorithm (SHA-1). For example, using SHA-1 algorithm, a delivery service provider may create a 20-byte SHA-1. (Stage 206). Each 20-byte SHA-1 is unique because it is created using a recipient's full name and that patron's Enhanced Modified Delivery Point. A delivery service provider then may receive, organize, and store 20-byte SHA's of its recipients in APTLink Secure Data Tables. (Stage 208).

As well known in the art, SHA-1 is a revision of the original Secure Hash Algorithm. SHA-1 computes a condensed representation of a message or a data file. When a message of any length less than $2^{64}$ bits is received as an input, the SHA-1 algorithm creates a 160-bit output code word called a message digest. The message digest then may be used as input to the Digital Signature Algorithm (DSA) to generate or verify the signature for the message. The SHA-1 algorithm is secure and can not be decoded by a user because it is computationally infeasible to find a message that corresponds to a given message digest, or to find two different messages which produce the same message digest.

To continuously update the APTLink database, a delivery service provider, such as the USPS, may use data disclosed on Change of Address Forms. As well known in the art, when a recipient's point of delivery changes, a recipient submits to the USPS a Change of Address Form. The Change of Address Form may require a recipient to indicate a patron's full name, an old address information and a new address information. When a new high-rise building, such as an apartment building, is built and its tenants move in, the USPS may also receive updates for the APTLink database from mail carriers servicing the geographical area where that building is located. The USPS may also request and receive updates from commercial entities maintaining their own databases containing secondary address data.

Figure 3:
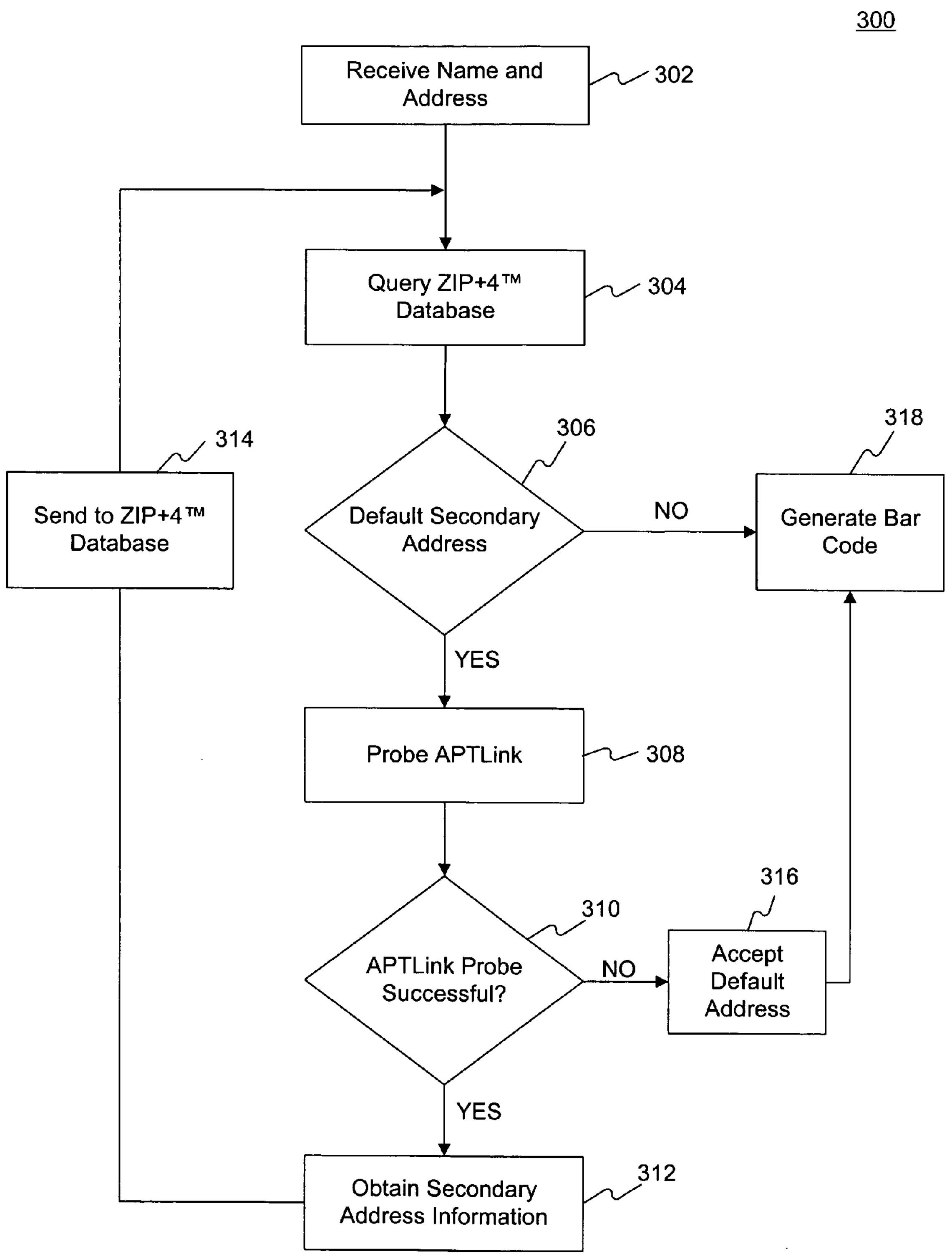
FIG. 3 is a flowchart of an exemplary process 300 for obtaining secondary address information using APTLink Secure Data Tables, consistent with the invention.

FIG. 3 is a flowchart of an exemplary process 300 for obtaining secondary address information using APTLink Secure Data Tables. When a business sender is preparing a mailpiece for mailing, it may desire to obtain the ZIP+4+2™ (11-digit format) code, print it, and attach it to the mailpiece. To obtain the ZIP+4+2™ code, the business sender may forward an address of a recipient, which is received by the ZIP+4™ database. (Stage 302). The ZIP+4™ data base is queried. (Stage 304). As well known in the art, an access to the ZIP+4™ database is available to the public, for example, via an internet. For example, anyone with the internet browser and a computer connected to the internet, may access the USPS website and request the ZIP+4+2™ (11-digit format) for any valid address information in the United States. Business senders may also purchase commercially available access to the ZIP+4™ database enabling speedy queries for a high volume of address information in a short period of time.

Several things may happen. First, when a query is received by the ZIP+4™ database (stage 306) with a delivery address information, the ZIP+4+2™ code for the address information at issue may be generated if the secondary address for that address information does not exist; for example, when a address information is a address information of a single family house. The ZIP+4+2™ code for the address information at issue may also be generated if that address information contains secondary address information, such as an apartment number. Once the ZIP+4+2™ is generated, it may be provided to the business sender for printing and attaching that barcode to the mailpiece it intends to mail. (Stage 318). If the address information does not contain the secondary information, such as, for example, an apartment number, or if that secondary information is incorrect, the ZIP+4™ database can not generate the ZIP+4+2™ code.

If the ZIP+4™ database returns a default address, the APTLink Secure Data Tables may need to be probed. (Stage 308). As a result of the APTLink Secure Data Tables probe, as discussed below (FIG. 4), a secondary address information may be revealed to the business sender requesting that information. (Stage 312). If, however, the APTLink Secure Data Tables do not contain secondary address information for the address information at issue, a business sender may be forced to accept a default address information described above. (Stage 316). Following acceptance of the default address information, the business sender may print and attach a default ZIP+4+2™ barcode to the mailpiece it intends to mail. (Stage 318). If the secondary address information was revealed (stage 312), it may be sent, together with the rest of the address information, to the ZIP+4™ database (stage 314) for requesting corresponding ZIP+4+2™ for subsequent printing and attaching to the mailpiece.

Figure 4:
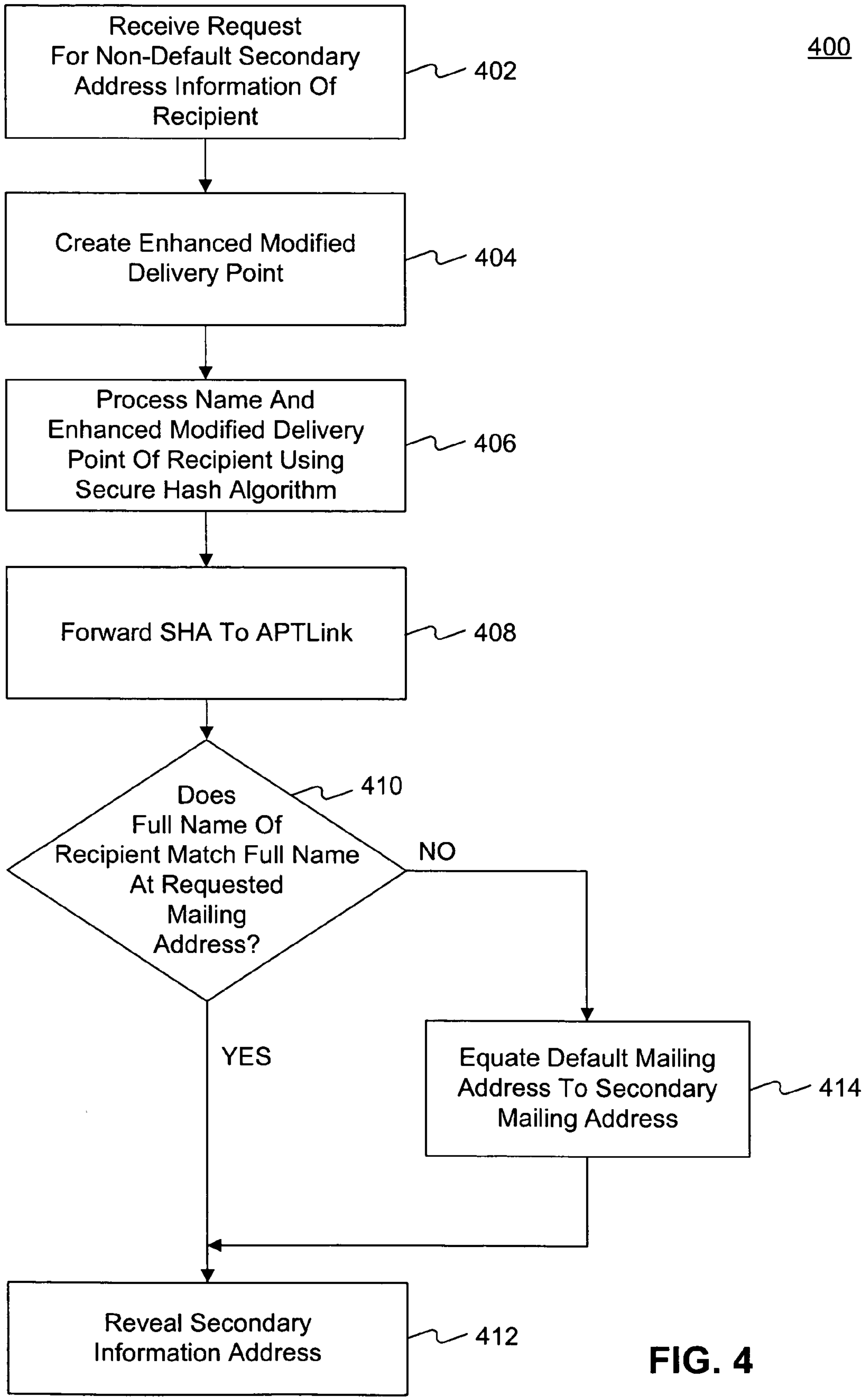
FIG. 4 is a flowchart of an exemplary process 400 for probing an APTLink Secure Data Tables, consistent with the invention.

FIG. 4 is a flowchart of an exemplary process 400 for probing an APTLink Secure Data Tables. It may include receiving a request for a non-default secondary address information of a recipient. (Stage 402). A request must include both the name and the address information of the recipient. To query the APTLink Secure Data Tables, the address information of the recipient may first be converted into EMDP, as discussed above. Then, by using the processing algorithm similarly to stage 206 (FIG. 2), both the name and the EMDP of that recipient may be combined for creating a secure unique identifier, such as a SHA-1, of that recipient. (Stage 404).

After the SHA-1 is created, it may be forwarded to the APTLink (stage 408) for finding a match in the APTLink Secure Data Tables. (Stage 410). If the APTLink is able to match the SHA of a full name of a recipient to a full name contained in its Secure Data Tables at the requested address information, a secondary address information may be revealed to a business sender. (Stage 412). Consistent with the present invention, the secondary address information may be revealed only for those mailing addresses which contain both a matching name and address information of the recipient. Having complete primary and secondary address information may allow a business sender to generate a non-default 11-digit code by querying the ZIP+4™ database (stage 314, FIG. 3). (Stage 412). If the APTLink Secure Data Tables do not contain a non-default secondary address information for a requested name of a recipient, a default secondary address information may be equated to a secondary address information (stage 414) as a result of the query.

Figure 5:
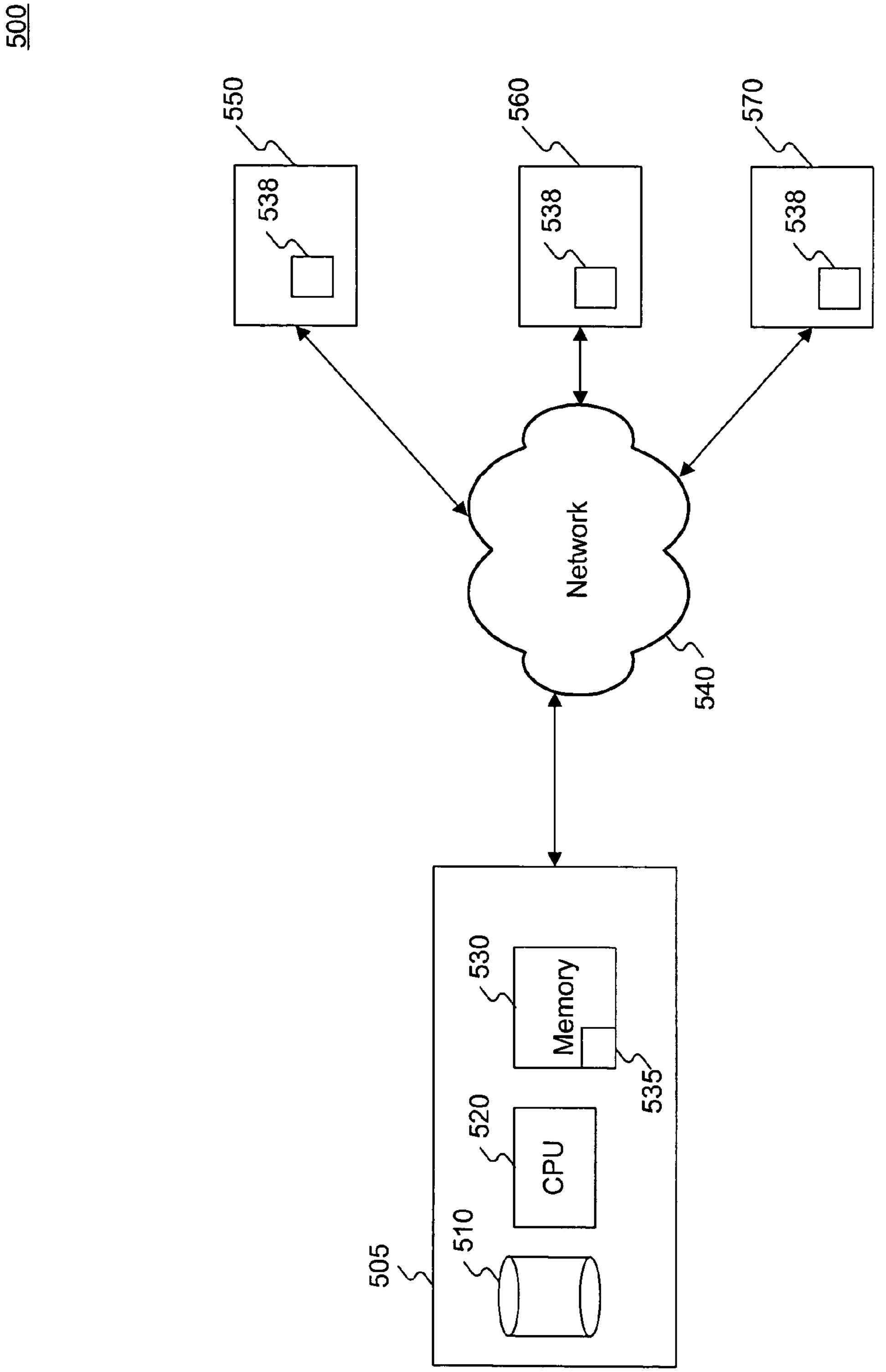
FIG. 5 is an exemplary structure of a system for providing software product and software updates, consistent with the invention.

APTLink Secure Data Tables together with a software enabling their use probing, may be stored electronically and provided to business senders upon request. FIG. 5 is an exemplary system 500, consistent with the invention, for providing a software product and software updates to business senders wishing to probe APTLink Secure Data Tables. System 500 includes a server 505, with a database 510, a CPU 520, and a memory 530, which is connected to a network 540. On a periodic basis, secondary address information may be extracted from database 510 and compiled into a software product, which is then made available to business senders.

Network 540 may provide communications between the various components in system 500, such as user terminals 550–570. Network 540 may be a shared, public, or private network and encompass a wide or local area. A distribution application 535 in memory 530 may distribute a client application 538. It may also provide updates to user terminals 550–570 via network 540.

Terminals 550–570 allow a user, such as a business sender, to send and/or receive information to/from server 505. Terminals 550–570 may be any type of appropriate device for communicating with server 505 over network 540. For example, terminal 550 may be a personal digital assistant (PDA) running a program for communicating with server 505, while terminal 560 may be a desktop computer running a web browser for communicating with sever 505 via the Internet. Optionally, any one of terminals 550–570 may be stand alone terminals, such a desktop computers, and may receive updates by loading software from a CD-ROM or other appropriate media.

To receive client application 538, a business sender may access server 505 via network 540 or operate software such as a web browser running on terminal 550. Data may be sent over network 540 to and from server 505 to terminal 550 during the updating process. For example, a business sender may periodically log into a website using terminal 550, and may optionally provide authentication credentials, such as a username and password, to receive software updates. Business senders may also select an option whereby updates are automatically provided as needed or on a periodic basis. Alternatively, software updates may be provided on media, such as a CD-ROM, that is distributed to business senders.

Once any necessary software updates are provided to any one of terminals 550–570, terminals 550–570 may execute client application 538 to obtain secondary address information. For example, a business sender that operates terminal 550 may store address information for recipients to which he mails mailpieces in a terminal memory (not shown). To update the address information, the business sender may execute client application 538 to obtain secondary address information in a manner consistent with the present invention.

The foregoing descriptions of the invention have been presented for purposes of illustration and description. They are not exhaustive and do not limit the invention to the precise form disclosed. Modifications and variations are possible in light of the above teachings or may be acquired from practicing of the invention. For example, the described implementation includes software but the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing delivery address information of a recipient, comprising:

receiving address information of the recipient, wherein the address information comprises a recipient name and a street address;

determining an address code of the recipient based on the address information;

creating a hash code for the recipient using the recipient name and the address code;

using the hash code to search a secure database for a delivery point code associated with the address information, wherein the delivery point code comprises a unique two-digit number corresponding to an apartment number of the recipient;

appending the delivery point code to the address code to create a complete address code, wherein the complete address code uniquely identifies a complete address of the recipient; and generating a bar code label for a delivery item, wherein the bar code label includes the complete address code.

2. The method of claim 1, wherein the address code includes ZIP4™ code of the recipient.

3. The method of claim 1, wherein the address code includes a house number of the recipient.

4. The method of claim 1, further comprising:

storing the hash code in a secure data table, wherein the hash code stored in the secure data table is maintained in a secure form.

5. The method of claim 1, wherein the address information of the recipient includes a secondary address information of the recipient.

6. The method of claim 5, further comprising:

setting the delivery point code to a default number when the secondary address information is erroneous.

7. A method for providing an address information, comprising:

receiving a request for the address information of a recipient, wherein the request includes a recipient name;

generating an address code of the recipient;

creating a hash code of the recipient using the recipient name and the address code;

querying a secure data table for hashed data using the hash code; and supplying secondary address information of the recipient when a match is found between the created hash code of the recipient and a hash code of the recipient stored in the secure data table.

8. The method of claim 7, wherein receiving a request further comprises receiving a default address information of the recipient.

9. The method of claim 7, wherein querying further comprises matching a combination of the recipient name and the address code to the recipient name and the address code stored in the secure data table.

10. The method of claim 7, wherein data stored in the secure data table is maintained in a secure form.

11. The method of claim 7, wherein the address code of the recipient includes ZIP4™ code of the recipient.

12. The method of claim 7, wherein the address code of the recipient includes a street number of the recipient.

13. The method of claim 7, wherein the address code of the recipient is seventeen digits long.

14. A method for receiving a secondary address information of a recipient, comprising:

requesting the secondary address information of a recipient;

generating an address code of the recipient;

creating a hash code of the recipient using the recipient name and the address code;

querying a secure data table for hashed data using the hash code;

receiving secondary address information of the recipient when a match is found between the created hash code of the recipient and the hash code of the recipient stored in the secure data table; and generating a unique code for affixing to a delivery item addressed to the recipient.

15. The method of claim 14, wherein requesting further comprises providing a default address information of the recipient.

16. The method of claim 14, wherein querying further comprises matching a combination of the recipient name and the address code to the recipient name and the address code stored in the secure data table.

17. The method of claim 14, wherein data stored in the secure data table is maintained in a secure form.

18. The method of claim 14, wherein the address code of the recipient includes ZIP4™ code of the recipient.

19. The method of claim 14, wherein a unique code is a barcode.

* * * * *

UNITED STATES PATENT AND TRADEMARK OFFICE

CERTIFICATE OF CORRECTION

PATENT NO. : 7,204,415 B2 
APPLICATION NO. : 10/953358
DATED : April 17, 2007
INVENTOR(S) : David J. Payne et al.

It is certified that error appears in the above-identified patent and that said Letters Patent is hereby corrected as shown below:

Claim 2, col. 8, line 40, "ZIP4™" should read --ZIP+4™--.

Claim 11, col. 9, line 11, "ZIP4™" should read --ZIP+4™--.

Claim 18, col. 10, line 19, "ZIP4™" should read --ZIP+4™--.

Signed and Sealed this

Third Day of July, 2007

JON W. DUDAS
*Director of the United States Patent and Trademark Office*